United States Patent [19]

Hubbard et al.

[11] 3,983,569

[45] Sept. 28, 1976

[54] INSTRUMENT PEN WITH INTEGRAL PEN ARM ATTACHMENT MEANS

[75] Inventors: James R. Hubbard, Moorestown; Charles A. Erdman, Marlton, both of N.J.

[73] Assignee: Graphic Controls Corporation, Buffalo, N.Y.

[22] Filed: Oct. 6, 1975

[21] Appl. No.: 619,632

Related U.S. Application Data

[63] Continuation-in-part of Ser. No. 540,123, Jan. 10, 1975.

[52] U.S. Cl. .......... 346/140 A

[51] Int. Cl.[2] .......... G01D 15/18

[58] Field of Search .......... 346/140, 140 A

[56] References Cited

UNITED STATES PATENTS

| | | | |
|---|---|---|---|
| 1,573,339 | 2/1926 | Watts | 346/140 A |
| 2,213,098 | 8/1940 | Smith | 346/140 A |
| 3,611,430 | 10/1971 | Watchorn et al. | 346/140 A |
| 3,934,255 | 1/1976 | Taylor | 346/140 A |

*Primary Examiner*—George H. Miller, Jr.
*Attorney, Agent, or Firm*—Miller, Frailey & Prestia

[57] ABSTRACT

A pen for use in recording instruments includes integral hinged member which folds over and locks in place on a pen arm and thus facilitates attachment of pen and pen arm. Preferably, integrally molded ribs are included to press into and to better secure the pen arm upon locking engagement of the hinged member.

12 Claims, 6 Drawing Figures

INSTRUMENT PEN WITH INTEGRAL PEN ARM ATTACHMENT MEANS

This is a Continuation-In-Part of my U.S. Application Ser. No. 540,123, filed Jan. 10, 1975.

This invention pertains to a pen useful as a recording instrument marker and particularly to such a pen with integral simple means for attaching and detaching the pen body and a pen arm of such instruments. More particularly, this invention pertains to such a pen with a specific integrally molded member providing such attachment means which securely fastens the pen to the pen arm.

Various means have been devised for securing pens or instrument markers in the marker holders of recording instruments. Typically the marker includes a marker body which holds an ink supply and which is held in the instrument by means of a spring clip surrounding the marker body. Such devices are seen, for example, in U.S. Pat. Nos. 841,222-Bowman, 2,673,138-Bartley et al and 3,778,840-Dahl. Other and somewhat different means for holding such markers are seen in U.S. Pat. Nos. 3,213,460-Gilovich, 3,416,155-Jones and 3,686,680-Bruzzano, all of which are thought to typify a variety of approaches which have been taken to secure recording pen markers in instrument assemblies.

A more specific marker pen holding means is seen in U.S. Pat. No. 3,611,430-Watchorn et al. There, dual pens each include a tapering wedge-shaped groove 17, (seen for example in FIG. 3 of that patent) in which is frictionally secured a pen arm 12 (as best seen in FIG. 1 of that patent).

Notwithstanding these prior art marker pen holding means, there remains a need for simple and positive marker pen holding means, particularly adaptable to securing a marker pen at the end of a pen arm. A further need is to provide such marker pen securing means which securely fastens the marker to the pen arm and which also readily facilitates detachment of the marker pen from the pen arm.

It is a general object of the present invention to provide such a marker and particularly a bucket pen marker or disposable porous tip marker with a simple integrally molded attachment means for a pen arm.

This general object, and other more specific objects which will be apparent from the subsequent description of this invention, are met briefly, by a plastic marker pen including an integrally molded hinged member adapted to fold against an external surface of the marker, the hinged member and the surface of the marker against which it is folded including engageable locking members adapted to secure the pen arm against the external surface of the marker when the hinged member is in its folded and locked position.

Preferably, a pen having a flat surface on one of its vertical sides includes molded projections on the flat surface and on the hinged member projecting from that surface, the molded projections being adapted to press against a pen arm and better secure such a pen arm when the hinged member is in its folded and locked position.

This invention may be better understood by reference to the following detailed description taken in conjunction with the appended claims and the drawings; in which:

Figure 1:
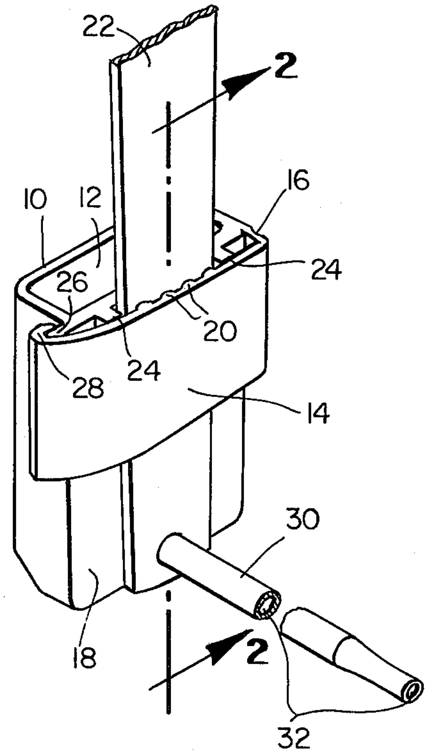
FIG. 1 is a perspective view of a marker pen, in its assembled form with writing tip and pen arm, embodying the present invention in a preferred form.

Referring more specifically to FIG. 1, there is shown a plastic bucket marker pen body 10 defining an ink reservoir 12 and including a hinged pen arm holding member 14 folded, at fold line 16, against surface 18 of marker body 10. Molded ridges or projections 20 on hinged member 14 press against pen arm 22, with which pen body 10 is assembled, securely holding pen arm 22 against surface 18. Molded projections or ridges 24 on surface 18 of pen body 10 assist in securing pen arm 22 in a fixed position on surface 18 of pen body 10. Pen body 10 and hinged member 14 also include engageable locking members 26 and 28 respectively adapted to prevent movement of hinged member 14 when it is folded upon surface 18 and in that position engages and secures pen arm 22. Writing tip 30 with a capillary ink passageway 32 projects from pen body 10 (and is held in sealed relationship therein) and through a hole provided therefor in pen arm 22, further limiting relative movement of pen arm 22 and pen body 10.

Figure 3:
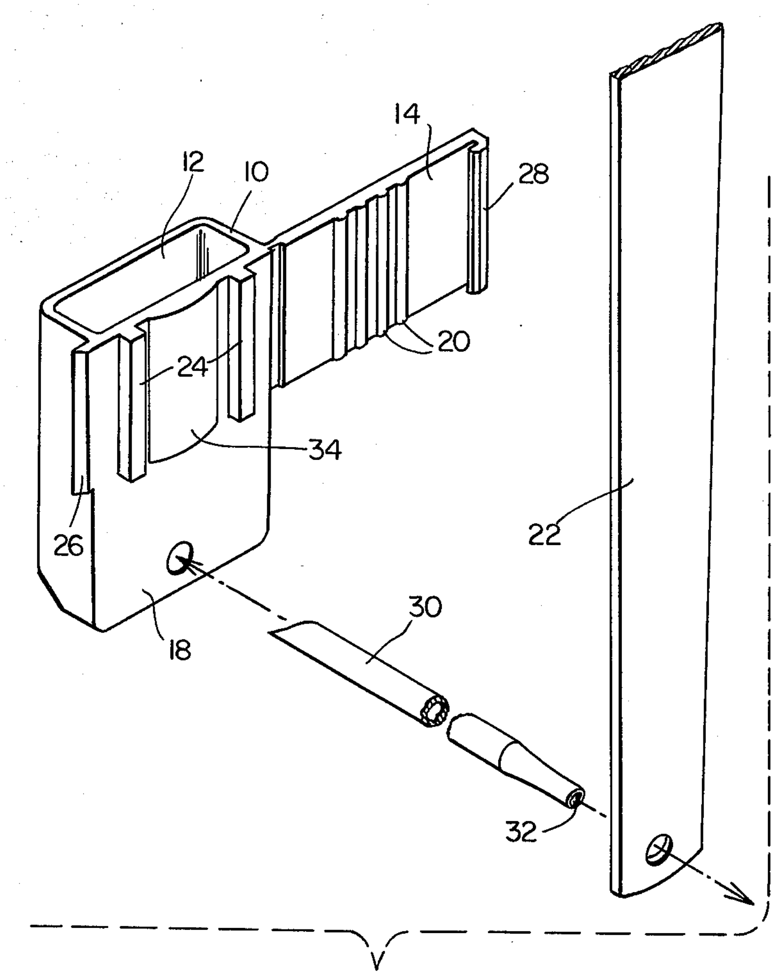
FIG. 3 is a perspective view of the unassembled components of the pen shown in FIG. 1.
Figure 2:
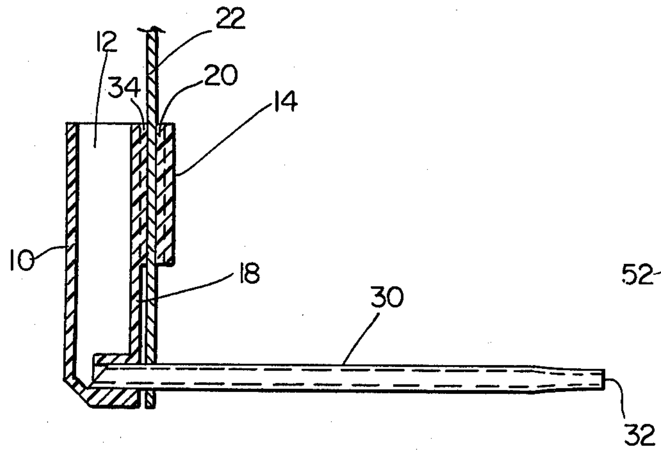
FIG. 2 is a sectional view of the pen shown in FIG. 1.

Further details of the embodiment of this invention illustrated in FIG. 1 may be seen in the sectional view thereof in FIG. 2 and in the disassembled perspective view thereof in FIG. 3. Referring specifically to FIG. 3, there is seen a further bevelled projection 34 against which pen arm 22 is pressed by projections or ridges 20 on hinged member 14 to assist in better securing pen arm 22 to marker body 10.

Figure 4:
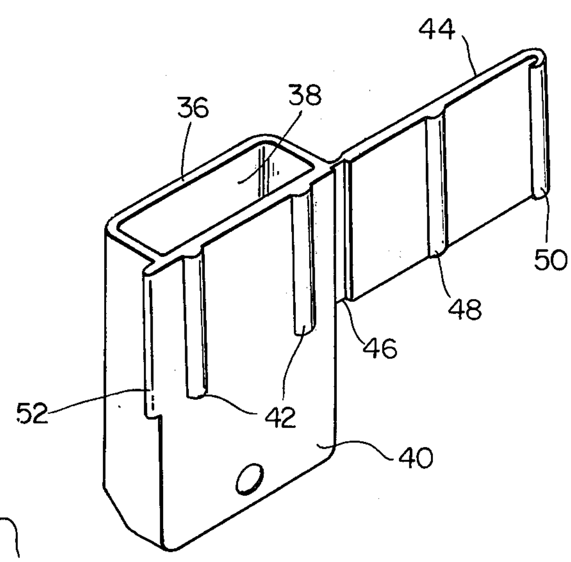
FIG. 4 is a perspective view of another marker pen body, also embodying a preferred form of the present invention.

In FIG. 4 there is shown a modified form of the pen body 10 shown in FIG. 1, which modified form is nevertheless within the scope of the preferred embodiment of the present invention. More specifically, pen body 36 defining an ink reservoir 38 includes surface 40 for engagingly receiving a pen arm between molded projections 42. Pen body 36 also includes a hinged member 44 foldable along a hinge line 46 and adapted, upon folding of hinged member 44 against surface 40, to secure a pen arm thereon between projections or ridges 42. A further ridge 48 on hinge member 44 is provided to press against such pen arm and better secure it in the assembly thereof with marker body 36. Engageable locking members 50 and 52 on hinged member 44 and marker body 36 respectively are provided to lock the assembly of marker body 36 and hinged member 44 in its folded position with a pen arm in the secured position.

Figure 5:
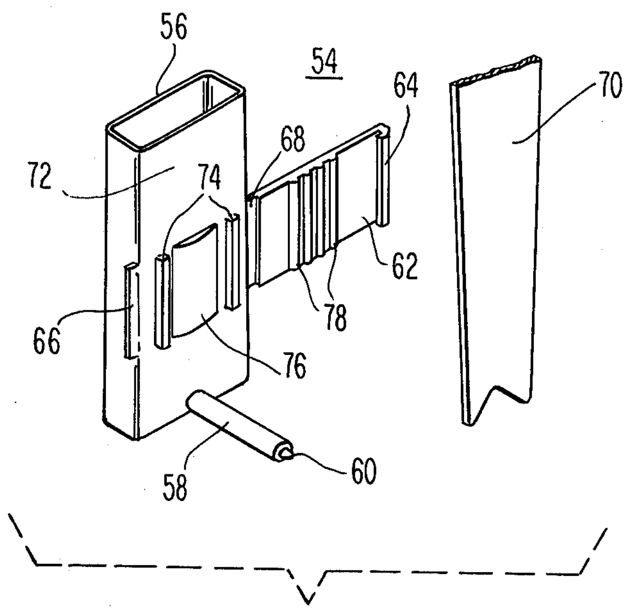
FIG. 5 is a perspective view of a disposable marker and pen arm embodying the present invention in a preferred form.

In FIG. 5, a disposable marker 54 is seen with a closed body 56 and extending writing tip 58, typically incorporating a fibrous, ink-retaining reservoir material, not seen, and a fibrous writing tip 60. In accordance with the preferred form of the present invention which is embodied in marker 54, marker body 56 includes an integrally molded hinge member 62 with locking edge 64 adapted to engage locking projection 66 on marker body 56 upon folding of hinge member 62 along hinge line 68 to securely fasten pen arm 70 against surface 72 of marker body 56, and more specifically to firmly retain pen arm 70 between molded positioning projections 74 of surface 72 and also between facing retaining projections 76 and 78 on surface 72 and hinge member 62, respectively. In this embodiment of the present invention, namely that which incorporates a disposable marker, the convenient, and relatively inexpensive, means for attaching and readily detaching marker 54 from pen arm 70 is most advantageous.

Figure 6:
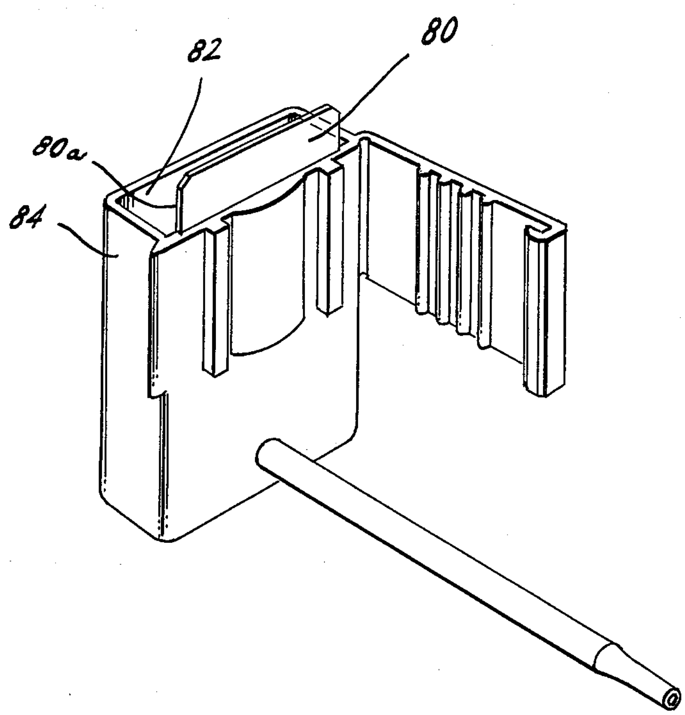
FIG. 6 is a perspective view of a modified and somewhat preferred embodiment of the pen shown in FIGS. 1–3.

In the marker body of FIG. 6, which is otherwise the same as the marker seen in FIGS. 1, 2 and 3, there is seen a plane member 80 extending upwardly and away from the reservoir space 82 of marker body 84. Member 80 serves as a guide facilitating refilling the bucket pen of this invention by permitting liquid ink to be poured or injected against the reservoir side 80a surface of member 80, following which the ink flows down into reservoir 82. Refilling the bucket pen of this invention is thus facilitated.

While this invention has been described with reference to particular and preferred embodiments, it should be understood that it is not limited thereto and that the appended claims are intended to be construed to encompass variations and modifications of these embodiments, as well as other embodiments, which may be made by those skilled in the art by the adoption of the present invention in its true spirit and scope.

Having thus described our invention, we claim and desire to secure by Letters Patent:

1. In an instrument marker pen body including an ink reservoir and means for receiving a writing tip, the improvement comprising a pen arm holding means consisting of an integrally molded hinged member adapted to fold against a surface of the pen body and to be locked against said surface by engageable locking means and to receive and secure in place against said surface a pen arm when said hinged member is in its folded and locked position.

2. An instrument marker pen body, as recited in claim 1, wherein said hinged member includes ridges molded therein adapted to press against a pen arm when said hinged member is in its folded and locked position.

3. An instrument marker pen body, as recited in claim 1, wherein said surface of said marker body includes molded projections adapted to fit a pen arm therebetween and prevent movement thereof toward said projections.

4. An instrument marker pen body, as recited in claim 1, wherein said ink reservoir comprises a body surrounding an enclosed space in which is disposed a fibrous body containing liquid ink.

5. An instrument marker pen body, as recited in claim 1, wherein said ink reservoir is adapted to receive a supply of liquid ink and is open at the top so that the liquid ink supply may be replenished from time to time.

6. An instrument marker pen body, as recited in claim 5, wherein said marker body includes a flat member extending away from an ink reservoir space in said body, said flat member adapted to guide liquid ink into said reservoir.

7. An instrument marker pen body, as recited in claim 1, wherein said surface includes a molded bevelled projection and said hinged member also includes molded projections, said molded bevelled projection on said surface and said molded projection on said hinged member facing one another when said hinged member is in its folded position, said molded bevelled projection on said flat member and said molded projection on said hinged member being adapted to press against a pen arm held therebetween when said hinged member is in its folded position.

8. An instrument marker pen body, as recited in claim 7, further includng additional molded projections on said surface adjacent said area in which said molded bevelled projection on said surface and said molded projections on said hinged member face one another when said hinged member is in its folded position, said projections adjacent said area adapted to receive the pen arm therebetween and prevent movement thereof along said surface.

9. An instrument marker pen body, as recited in claim 8, wherein said marker body and said hinged member include locking engagement means for holding said hinged member in its folded position against said surface of said marker body.

10. An instrument marker pen body, as recited in claim 9, wherein said ink reservoir comprises a body surrounding an enclosed space in which is disposed a fibrous body containing liquid ink.

11. An instrument marker pen body, as recited in claim 9, wherein said ink reservoir is adapted to receive a supply of liquid ink and is open at the top so that the liquid ink supply may be replenished from time to time.

12. An instrument marker pen body, as recited in claim 11, wherein said marker body includes a flat member extending away from an ink reservoir space in said body, said flat member adapted to guide liquid ink into said reservoir.

* * * * *